REPRODUCING APPARATUS FOR USE WITH SOUND RECORDS OF THE EMBOSSED TYPE

Filed Feb. 26, 1963 3 Sheets-Sheet 1

INVENTORS
JOSEPH A. RESCSANSKI
JOHN G. WALLACE
BY Curtis Morris & Safford
ATTORNEYS June 8, 1965 J. A. RESCSANSKI ETAL 3,188,092

REPRODUCING APPARATUS FOR USE WITH SOUND RECORDS OF THE EMBOSSED TYPE

Filed Feb. 26, 1963 3 Sheets-Sheet 2

INVENTORS
JOSEPH A. RESCSANSKI
JOHN G. WALLACE
BY
Curtis Morris + Safford
ATTORNEYS INVENTORS
JOSEPH A. RESCSANSKI
JOHN G. WALLACE
BY
Curtis Morris + Safford
ATTORNEYS 3,188,092
Patented June 8, 1965

3,188,092

REPRODUCING APPARATUS FOR USE WITH SOUND RECORDS OF THE EMBOSSED TYPE

Joseph A. Rescsanski, Trumbull, and John G. Wallace, Branford, Conn., assignors to Dictaphone Corporation, Bridgeport, Conn.

Filed Feb. 26, 1963, Ser. No. 261,085
11 Claims. (Cl. 274—13)

This invention relates to electromechanical translating devices for use in reproducing signals recorded on a record of the embossed type. More in particular, this invention relates to means for assuring that the reproducing stylus engages the true signal groove on such a record, rather than the unrecorded "land" between adjacent signal grooves.

As pointed out in U.S. Patent 2,819,089, issued on January 7, 1958, to Williams et al., recording machines utilizing records of the embossed type, e.g. records formed of plastic such as cellulose acetate butyrate, present a problem known as "blind tracking" during reproduction of the record. This problem arises because the record is "swaged" by the recording stylus in such a way as to form a pair of beads, or "spoil banks," on either side of the signal groove, thereby defining a false groove on the "land" between adjacent signal grooves. If the reproducing stylus, as it is placed on the record, falls into this false groove, an unintelligible combination of the signals in the adjacent grooves is reproduced. Because in earlier conventional recording apparatus both spoil banks were relatively high, there was a severe problem of providing means for automatically shifting the reproducing stylus from the false groove into the true signal groove.

The invention described in the above-identified Patent 2,819,089 substantially minimizes the severity of this problem by utilizing a method of recording wherein the recording stylus is tipped laterally at a substantial angle. The result achieved by such an arrangement is that the record material swaged out by the recording stylus flows predominantly to one side of the signal groove. Consequently, one of the spoil banks alongside the signal groove is substantially lower than it would have been if the stylus had not been tipped laterally, while the other spoil bank is correspondingly higher. By nearly eliminating one of the spoil banks in this manner, it became practical to provide means for automatically shifting the reproducing stylus from the false groove and into the true signal groove.

The arrangement proposed in the above-identified Patent 2,819,089 for shifting the reproducing stylus from the false groove into the signal groove was to provide an offset weight on the reproducer arm so as to displace the center of mass of this arm away from the normal trailing axis between the stylus and the pivot mounting for the reproducer arm. This offset weight thus created a bias urging the reproducer arm laterally in a direction to cause the stylus to move from the false groove, over the low spoil bank, and into the signal groove where further lateral movement was prevented by the higher spoil bank. However, it has turned out in practice that this reproducer biasing arrangement, and other similar arrangements for urging the reproducer stylus laterally, has not been as fully effective as might be desired. That is, with such arrangements there still is a significant, although small, statistical chance that the reproducer stylus may stay in the false groove once it has landed there. Moreover, the reproducer bias arrangements used heretofore have, by continually urging the stylus against one wall of the signal groove during playback, introduced undesirable noise and distortion.

Accordingly, it is an object of this invention to provide superior reproducing apparatus for use with records of the swaged or embossed type. A further object of this invention is to provide signal reproducing equipment arranged to effectively eliminate the problems of blind tracking presented by records of the embossed type. A more specific object of this invention is to provide improved means for automatically shifting a reproducing stylus from the false groove of an embossed record and into the true signal groove thereof, and which is capable of tracking the signal groove without a lateral bias during playback. Other objects, aspects and advantages of the present invention are in part pointed out in, and in part apparent from, the following description of a preferred embodiment of the invention considered together with the accompanying drawings, in which:

Figure 1:
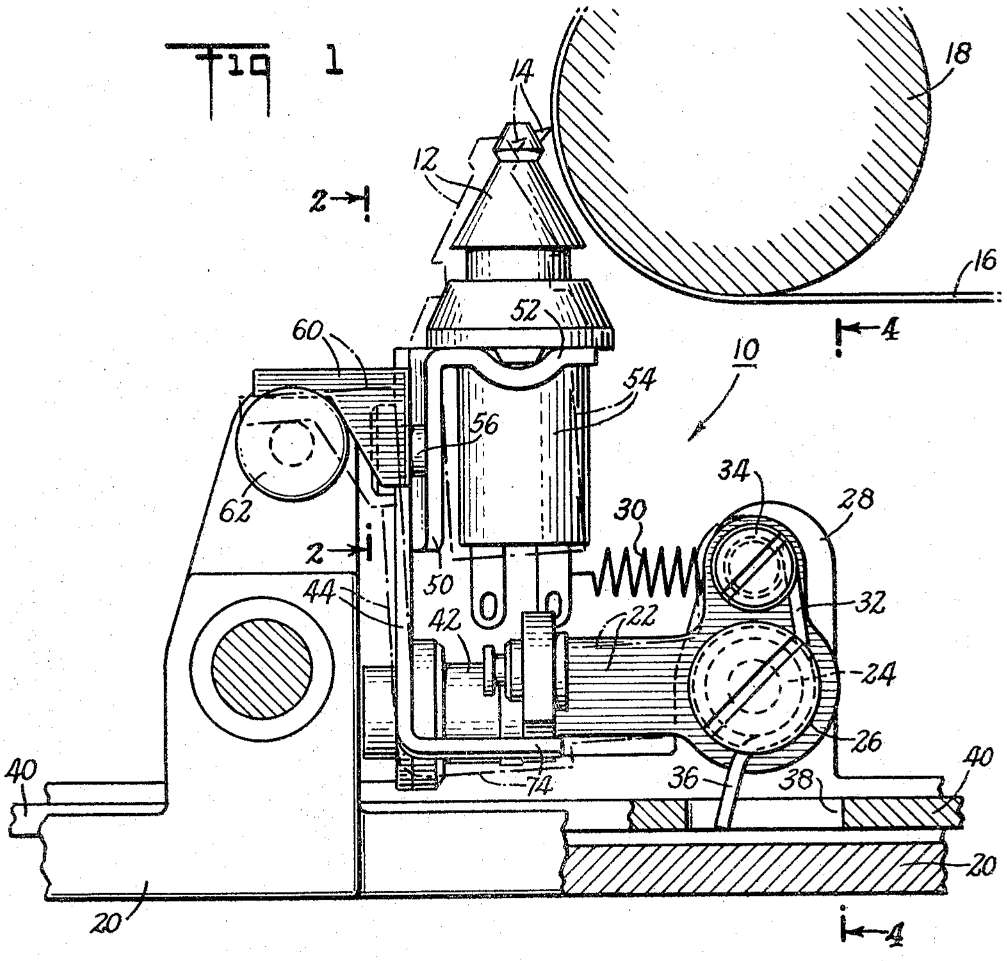
FIGURE 1 is a cross-section showing a reproducing device constructed in accordance with this invention.

Before describing the present invention in detail, it is desired to note that this invention is portrayed herein as embodied in a commercial dictating machine of the type disclosed in application Serial No. 196,189, filed on May 21, 1962 by William F. Wolfner, II et al, and reference should be made to that copending application for further details on the functioning of the overall equipment. Referring now to FIGURE 1 herein, there is shown a reproducer assembly 10 comprising a reproducing head 12 having a stylus 14 engaged with a plastic belt-type record 16 which is supported on a rotatable drive mandrel 18. As will be explained hereinbelow in more detail, the reproducer assembly 10 is mounted on a carriage 20 adapted to be driven laterally, i.e. perpendicular to the plane of the drawing of FIGURE 1, and transversely with respect to the record grooves, so that during reproduction the stylus 14 will continuously track the helical signal groove previously swaged in the record 16 by a recording head (not shown herein).

Figure 5:
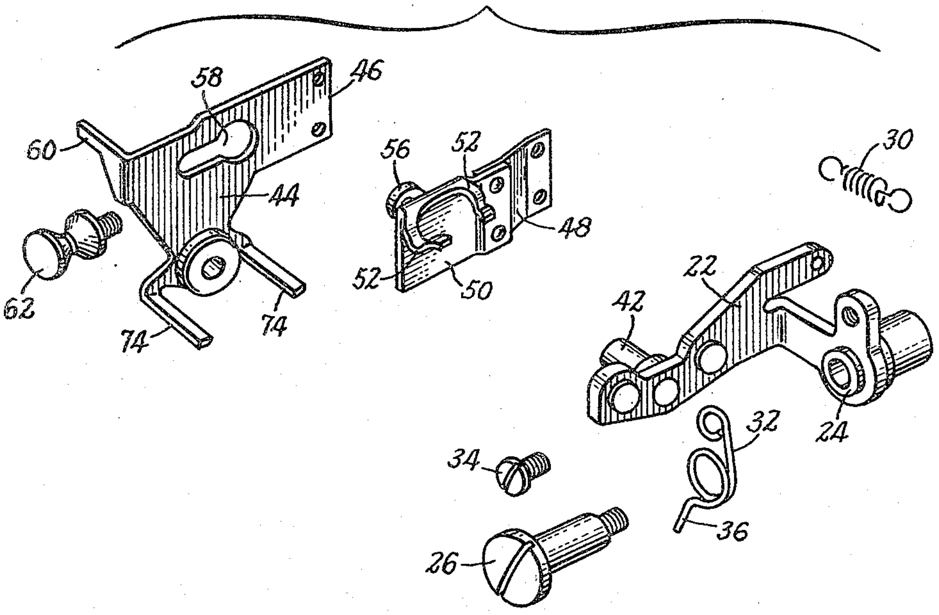
FIGURE 5 is an exploded perspective view of certain elements of the reproducer assembly.

The reproducer assembly 10 is supported on the carriage 20 in basically the same manner as that disclosed in the above-identified copending application. This mounting arrangement provides for a retractive movement of the reproducing head 12 away from the record 16, e.g., to permit the carriage to be backspaced without sliding the stylus 14 across the surface of the record. To accommodate this retraction of the reproducing head, and referring also to FIGURE 5, the reproducer assembly is carried on a support arm 22 having a collar 24 which is pivotally secured by a screw 26 to an upright 28 forming part of the carriage 20. This arm is biased clockwise (FIGURE 1) by a small coil spring 30 which normally determines the pressure of engagement between the stylus and the record during reproducing operations.

To retract the stylus 14, the support arm 22 is rotated counterclockwise (FIGURE 1) by means of a relatively rigid wire 32 which is wrapped around collar 24. The upper end of this wire is anchored by a screw 34, while its lower end defines a finger 36 extending into a hole 38 in a slide 40 mounted on the carriage 20. This slide is adapted to be shifted towards the rear of the dictating machine, i.e. to the right in FIGURE 1, and when so shifted, it engages the finger 36 and thereby applies a torque to the support arm 22 so as to rotate the reproducer assembly 10 counterclockwise to withdraw the stylus from the record.

Figure 2:
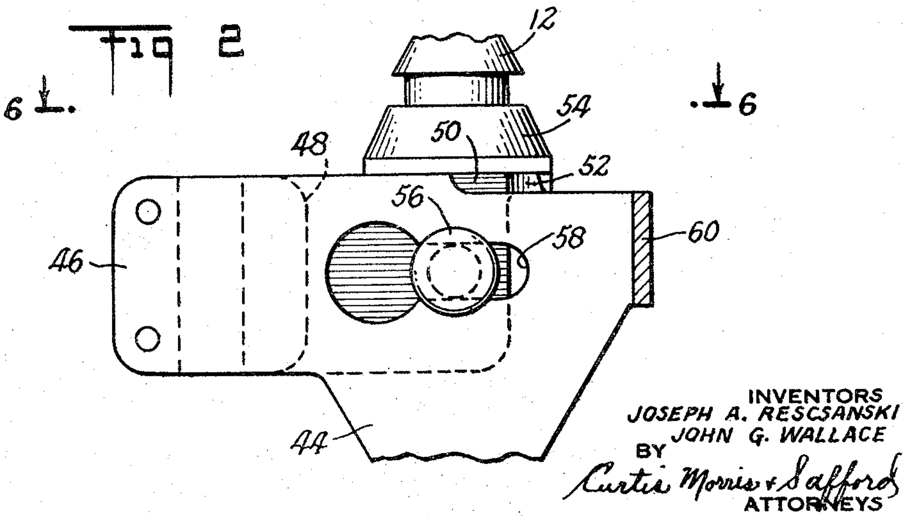
FIGURE 2 is a section taken along line 2—2 of FIGURE 1.
Figures 3, 4:
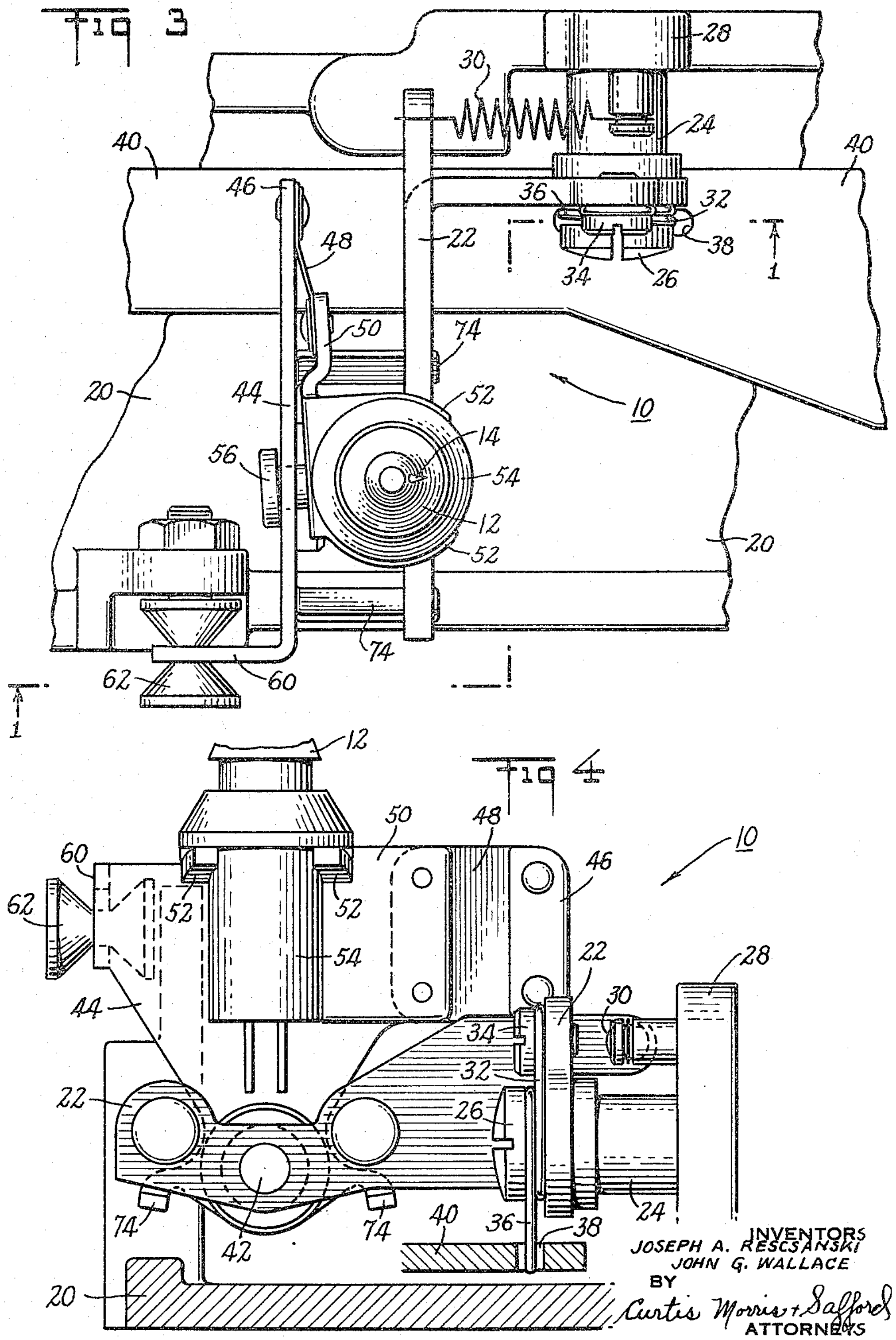
FIGURE 3 is a top view of the reproducing apparatus shown in FIGURE 1.
FIGURE 4 is a section taken along line 4—4 of FIGURE 1.

Extending forwardly from the support arm 22 is a stub shaft 42 on which a vertical support bracket 44 is rotatably mounted by means of a conventional high-viscosity silicone bearing (not shown herein in detail). Riveted to one side 46 of this support bracket is a flat beryllium-copper spring 48 which extends at a small angle with respect to the bracket and carries a vertical support plate 50 at its other end. This plate is provided with a pair of horizontal forked arms 52 shaped to receive and hold the plastic casing 54 of the reproducing head 12. The flat spring 48 urges the plate 50 away from the bracket 44, but movement in this direction is limited by a headed pin 56 which extends through a slot 58 in the bracket (see also FIGURE 2).

The support bracket 44 also is provided with a horizontal guide bar 60 which is adapted, when the reproducer assembly 10 is rotated away from the record 16, to engage a centering device 62 consisting of a pair of facing cones mounted on the carriage 20. Thus, when the stylus 14 is retracted from the record, it is automatically centered to a predetermined rotational position with respect to shaft 42 on which bracket 44 is pivoted.

When the stylus 14 is to be reengaged with the record 16, the slide 40 is shifted back to the left (FIGURE 1) to release the wire finger 36 and permit the coil spring 30 to rotate the support arm 22 clockwise. The support bracket 44 is statically balanced about shaft 42 and this, especially in combination with the high viscosity of the silicone bearing on shaft 42, assures that there is effectively no rotation of bracket 44 even though the guide bar 60 is no longer engaged with the centering device 62. Thus spring 30 moves the stylus 14 directly towards the record 16 until the stylus makes contact with it, thereby preventing further movement of the stylus in this direction.

Once the stylus 14 has made contact with the record 16, the force of the spring 30 thereafter is applied against the flat spring 48 and overcomes the biasing action of this spring. Thus the support bracket 44 continues to move towards support plate 50, this further movement being accommodated by the lost-motion connection comprising the pin 56 extending through slot 58. As a result of this further movement of the bracket 44, the support plate 50 is, in effect, rotated about the riveted side 46 of the bracket 44 into a position closely abutting this bracket, as indicated in broken outline in FIGURE 6.

When the support plate 50 has been rotated into a position abutting bracket 44, it will be evident that the reproducer stylus 14 has been correspondingly shifted laterally relative to the support bracket 44, as a result of the geometry of the associated parts. This relative movement, indicated by the reference numeral 64, is shown exaggerated in FIGURE 6 for purposes of illustrating and clarifying the invention. In the embodiment of the invention disclosed herein, the geometry of the design provides for lateral movement of the stylus relative to the bracket 44 of about .005".

Figure 7:
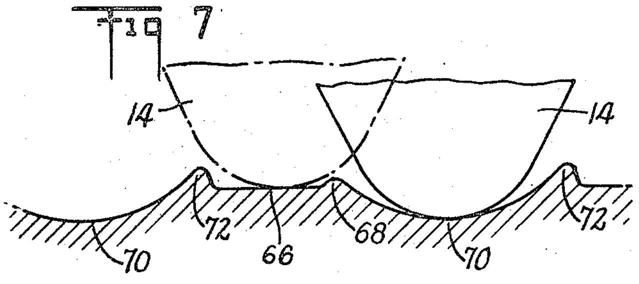
FIGURE 7 is a schematic view, not entirely to scale, illustrating the cross-sectional appearance of the embossed record grooves.

If it now be assumed that the stylus 14 initially came to rest on one of the lands 66 of the record 16, as shown in FIGURE 7, the lateral movement of the stylus subsequent to this initial contact with the record is sufficient to shift the stylus over the lower spoil bank 68 and into the next adjacent signal groove 70. While the stylus is undergoing this relatively rapid lateral shifting movement, the support bracket 44 is effectively prevented from rotating about the shaft 42 by the high viscosity (e.g. 200,000 centipoises) of the silicone in the bearing between these two parts. Any tendency of the stylus to move beyond the signal groove is of course inhibited by the higher spoil bank 72 on the far side of the signal groove.

The pitch of the signal grooves on the record 16 typically is set to provide an average center-to-center spacing between signal grooves of about .005". Normally, the spacing between a land 66 and its adjacent groove 70 will be about .003". Thus, if the stylus falls in the land, the .005" lateral movement of the stylus relative to the bracket 44 is ample to assure shifting the stylus into the signal groove. Any excess lateral movement of the stylus is absorbed by lost motion in the system, e.g. movement of bracket 44 about the silicone bearing on shaft 42.

It may also be noted that, once the plate 50 has been rotated into its reproducing position abutting bracket 44, with flat spring 48 extending in a direction which is effectively parallel to the surface of the record where it is engaged by the stylus, there will be no further biasing force tending to urge the stylus laterally. Thus the stylus will float freely in the signal groove and provide optimum reproducing characteristics.

Figure 6:
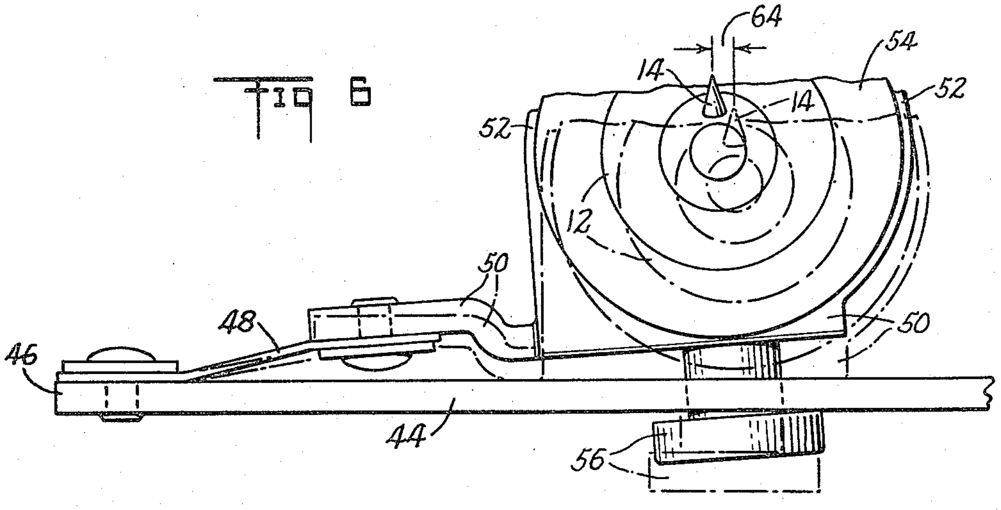
FIGURE 6 is an enlarged horizontal section taken along line 6—6 of FIGURE 2.

In the event that the stylus 14 initially comes to rest in the signal groove 70, the subsequent rotation of the support plate 50 about the flat spring 48, as indicated in broken outline in FIGURE 6, will merely cause the support bracket 44 to rotate about its pivot shaft 42, rather than force the stylus to climb out of the signal groove. This is because the resistance to movement of bracket 44 presented by the silicone bearing on shaft 42 is less than the resistance to movement of stylus 14 presented by the side wall of the signal groove, especially when the side wall is extended upwardly by the high spoil bank 72. Accordingly, once the stylus has engaged the true signal groove, it will remain there until retracted from the record as described hereinabove.

During a reproducing operation, it sometimes happens that the carriage does not advance precisely at the rate required to maintain the stylus 14 aligned with the helical signal groove on the record 16. Such asynchronism is accommodated by rotation of the support bracket 44 about its pivot shaft 42. Since the rotation of the bracket is quite slow in such situations, the relatively high viscosity of the silicone bearing on the shaft 42 does not interfere with the required rotary movement of this bracket. The bracket 44 also is provided with horizontal stops 74 adapted to engage the underside of the support arm 22 to prevent excessive rotary movement of the bracket.

Although a specific preferred embodiment of the invention has been set forth in detail, it is desired to emphasize that this is not intended to be exhaustive or necessarily limitative; on the contrary, the showing herein is for the purpose of illustrating the invention and thus enable others skilled in the art to adapt the invention in such ways as meet the requirements of particular applications, it being understood that various modifications may be made without departing from the scope of the invention as limited by the prior art.

We claim:

1. A reproducing assembly for use with records of the embossed type having a plurality of substantially parallel signal grooves separated by a land on which a reproducing stylus may by chance come to rest, said assembly comprising, in combination, a reproducer head including a stylus for engaging the signal grooves on the record, support means for said reproducer head, means mounting said reproducer head on said support means, said support means being movable in a manner to cause the stylus to be shifted towards or away from the record to permit the stylus to be engaged with or disengaged from a signal groove, stylus engaging means for moving said support means to press said stylus against the record, means forming part of said reproducer head mounting means to provide for further movement of said support means after the stylus has been pressed against the record under the urging of said stylus engaging means, and means responsive to said further movement of said support means to shift said reproducer head transversely with respect to said signal grooves, whereby the stylus will be shifted from a land between a pair of adjacent signal grooves and into one of said signal grooves.

2. A reproducing assembly for use with records of the embossed type having a plurality of adjacent signal grooves separated by a land on which a reproducing stylus may by chance come to rest, said assembly comprising, in combination, a reproducer head including a stylus for engaging the signal grooves on the record, support means for said reproducer head, said support means being movable in a direction generally normal to the surface of the record as well as in a lateral direction so that the stylus may track the signal groove, means mounting said reproducer head on said support means, said mounting means including lost-motion means to permit relative movement between said reproducer head and said support means in a direction at least approximately parallel to said normal direction, said mounting means further including means to shift said reproducer head in said lateral direction with respect to said support means in response to said relative movement of said reproducer head and said support means, whereby the stylus will be displaced laterally from a land between a pair of adjacent signal grooves and into one of said signal grooves.

3. A reproducing assembly for use with records of the embossed type having a plurality of adjacent signal grooves separated by a land on which a reproducing stylus may by change come to rest, said assembly comprising, in combination, a reproducer head including a stylus for engaging the signal grooves on the record, support means for said reproducer head, said support means being movable in a direction generally normal to the surface of the record as well as in a lateral direction transversely with respect to the signal grooves, so that the stylus may track the engaged signal groove, means mounting said reproducer head on said support means in a position between the record and said support means, said mounting means being constructed and arranged to permit relative movement between said reproducer head and said support means in a direction at least approximately parallel to said normal direction, said mounting means including means to shift said reproducer head in said lateral direction relative to said support means as said support means moves towards said reproducer head after the stylus has engaged said record, whereby the stylus can be shifted from the land between a pair of adjacent signal grooves and into one of said signal grooves.

4. A reproducing assembly for use with records of the embossed type having a plurality of parallel signal grooves separated by a land on which a reproducing stylus may by chance come to rest, said assembly comprising, in combination, a reproducer head including a stylus for engaging the signal grooves on the record, support means for said reproducer head, pivot mounting means securing said reproducer head on said support means to permit said reproducer head to rotate a small amount with respect to said support means, said support means being movable in a manner to cause the stylus to be shifted towards or away from the record to permit the stylus to be engaged with or disengaged from a signal groove, the pivot axis of said pivot mounting means being offset laterally with respect to the line of movement of said stylus, stylus engaging means for moving said support means in a direction to press said stylus against the record, said reproducer head being rotatable about said support means by the pressure of said engaging means after the stylus has been pressed against the record so as to displace said reproducer head transversely with respect to said signal grooves to shift the stylus from a land between a pair of adjacent signal grooves and into one of said signal grooves.

5. A reproducing assembly for use with records of the embossed type having a plurality of substantially parallel signal grooves separated by a land on which a reproducing stylus may by chance come to rest, said assembly comprising, in combination, a reproducer head including a stylus for engaging the signal grooves on the record, a support bracket for said reproducer head, spring means mounting said reproducer head on said support bracket, said support bracket being movable in a manner to cause the stylus to be displaced towards or away from the record to permit the stylus to be engaged with or disengaged from a signal groove, said spring means being secured to said bracket in a region thereof which is laterally offset from the line of movement of said stylus, stylus engaging means for moving said support bracket to press said stylus against the record, and thereafter to rotate said reproducer head about said spring means as the support bracket continues to move relative to said reproducer head, the rotational movement of said reproducer head serving to shift said stylus transversely with respect to said signal grooves and thereby to shift the stylus from a land between a pair of adjacent signal grooves and into one of said signal grooves.

6. A reproducing assembly for use with records of the embossed type having a plurality of parallel signal grooves separated by a false groove in which a reproducing stylus may by chance come to rest, said assembly comprising, in combination, a reproducer head including a stylus for engaging the signal grooves on the record, a support bracket for said reproducer head, an elongated spring securing said reproducer head on said support bracket, pivotal mounting means for said support bracket arranged to accommodate rotary movement thereof in a direction to cause the stylus to be shifted towards or away from the record to permit the stylus to be engaged with or disengaged from a signal groove, said elongated spring being fastened at one end to said support bracket at a point offset laterally with respect to the line of movement of said stylus, spring bias means urging said support bracket about its pivotal mounting means to press said stylus against the record, said reproducer head being rotatable about said fastened end of said elongated spring by the pressure of said spring bias means after the stylus had contacted the record, whereby to displace the stylus from a false groove between a pair of adjacent signal grooves and into one of said signal grooves.

7. A reproducing assembly for use with records of the embossed type having a plurality of substantially parallel signal grooves separated by a false groove on which a reproducing stylus may by chance come to rest, said assembly comprising, in combination, a reproducer head including a stylus for engaging the signal grooves on the record, a support bracket mounted for movement towards and away from the record, a bendable element secured at one end to said support bracket and extending at an angle that is slightly less than perpendicular with respect to the direction of said bracket movement, the other end of said element carrying said reproducer head, said bendable element being so positioned that an imaginary line between the two ends thereof is at least approximately perpendicular to the signal grooves of said record, and means urging said support bracket towards the record to press said stylus against said record, thereby to bend said bendable element after the stylus has contacted the record and rotate said reproducer head slightly to shift said stylus from a false groove between a pair of adjacent signal grooves and into one of said signal grooves.

8. A reproducing assembly for use with records of the embossed type having a plurality of substantially parallel signal grooves separated by a false groove on which a reproducing stylus may by chance come to rest, said assembly comprising, in combination, a carriage to provide traveling movement laterally with respect to the surface of the record, a support arm movably mounted on said carriage to provide motion towards and away from the record, a support bracket movably mounted on said support arm to permit movement of said bracket in said lateral direction, a reproducer head including a stylus for engaging the signal grooves on the record, a flat spring element secured at one end to said reproducer head and at its other end to said support bracket, said element extending at an angle that is slightly less than perpendicular with respect to the direction of movement of said bracket towards and away from said record, and spring bias means urging said support bracket towards the record to press said stylus of said reproducer head against said record, said spring bias means being sufficiently powerful to bend said flat spring element after the stylus has contacted the record so as to rotate said reproducer head slightly and thereby shift said stylus from a false groove between a pair of adjacent signal grooves and into one of said signal grooves.

9. A reproducing assembly for use with records of the embossed type having a plurality of substantially parallel signal grooves separated by a false groove on which a reproducing stylus may by chance come to rest, said assembly comprising, in combination, a carriage to provide travelling movement laterally with respect to the surface of the record, a support arm pivotally mounted on said carriage to provide motion in a direction towards and away from the record, a support bracket, bearing means pivotally mounting said bracket on said support arm and arranged to accommodate rotary movement of said bracket in a plane perpendicular to said direction towards and away from the record, said bearing means including high viscosity damping means to resist fast movements of said bracket, a reproducer head including a stylus for engaging the signal grooves on the record, a flat spring element secured at one end to said reproducer head, the other end of said element being secured to said support bracket at a point laterally offset from the line of movement of said stylus towards and away from the record, said element normally extending at an angle that is slightly less than perpendicular with respect to said line of movement of said stylus, and spring bias means urging said support bracket towards the record to press said reproducer head stylus against the record, said spring bias means being sufficiently powerful to bend said flat spring element after the stylus has contacted the record, thereby to rotate said reproducer head slightly and shift said stylus from a false groove between a pair of adjacent signal grooves and into one of said signal grooves.

10. Apparatus as claimed in claim 9, wherein said flat spring element extends in a direction parallel to the surface of the record after said reproducer head is rotated to shift said stylus into the signal groove.

11. A reproducing assembly for use with sound records of the type having a plurality of substantially parallel signal grooves separated by a land on which a reproducing stylus may by chance come to rest, said assembly comprising, in combination, a reproducer head including a stylus for engaging the record, support means for said reproducer head, means mounting said reproducer head on said support means, said support means being movable in a direction to cause the stylus to be shifted towards and away from the record to permit the stylus to be engaged with and retracted from a signal groove, stylus engaging means for moving said support means to press said stylus against the record, said reproducer head mounting means including an elongated spring connecting said reproducer head to said support means, said elongated spring normally extending at a small angle with respect to the surface of the record and in a direction at least approximately perpendicular to the signal grooves of the record, said spring being bendable by the force of said stylus engaging means to a position substantially parallel to the surface of the record after the stylus has contacted the record, whereby the stylus will be shifted from a land between a pair of adjacent signal grooves and into one of said signal grooves, and the stylus thereafter will float freely within the signal groove without lateral biasing.

References Cited by the Examiner

UNITED STATES PATENTS

| | | | |
|---|---|---|---|
| 2,819,089 | 1/58 | Williams | 274—46 |
| 3,023,011 | 2/62 | Wagner | 274—13 X |

NORTON ANSHER, *Primary Examiner.*